United States Patent
Kobayashi et al.

(10) Patent No.: US 10,411,548 B2
(45) Date of Patent: Sep. 10, 2019

(54) WATERPROOF STRUCTURE FOR ELECTRIC MOTOR

(71) Applicant: FANUC CORPORATION, Yamanashi (JP)

(72) Inventors: Kouji Kobayashi, Yamanashi (JP); Takeshi Tamaki, Yamanashi (JP); Koutarou Yamada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/483,175

(22) Filed: Apr. 10, 2017

(65) Prior Publication Data

US 2017/0302123 A1   Oct. 19, 2017

(30) Foreign Application Priority Data

Apr. 14, 2016 (JP) ................. 2016-080874

(51) Int. Cl.
| | |
|---|---|
| *H02K 5/12* | (2006.01) |
| *H02K 5/10* | (2006.01) |
| *H02K 5/22* | (2006.01) |
| *H01R 13/52* | (2006.01) |
| *H02K 11/40* | (2016.01) |

(52) U.S. Cl.
CPC .......... *H02K 5/12* (2013.01); *H01R 13/5202* (2013.01); *H02K 5/10* (2013.01); *H02K 5/225* (2013.01); *H02K 11/40* (2016.01); *H01R 13/5216* (2013.01)

(58) Field of Classification Search
CPC .................. H02K 5/12; H02K 5/225

USPC .......................................... 310/71
See application file for complete search history.

(56) References Cited

U.S. PATENT DOCUMENTS

| 5,801,465 A * | 9/1998 | Yamada ............... H01R 13/523 |
|---|---|---|
| | | 174/77 R |
| 2002/0047330 A1* | 4/2002 | Martin ................... H02K 5/225 |
| | | 310/43 |

(Continued)

FOREIGN PATENT DOCUMENTS

| CN | 101155994 B | 11/2010 |
|---|---|---|
| CN | 103928787 A | 7/2014 |

(Continued)

OTHER PUBLICATIONS

An Office Action mailed by the Japanese Patent Office dated Apr. 3, 2018, which corresponds to Japanese Patent Application No. 2016-080874 and is related to U.S. Appl. No. 15/483,175.

(Continued)

*Primary Examiner* — Thomas Truong
(74) *Attorney, Agent, or Firm* — Studebaker & Brackett PC

(57) ABSTRACT

To provide a waterproof structure for an electric motor that simultaneously achieves electrical connection between a power connector and a wiring substrate, an earth connection between the power connector and a stator, and sealing between the power connector and the stator. A power connector (6) includes a sealing member (7) that seals between the power connector (6) and a stator (2), a wiring substrate (5) and the power connector (6) include connector connecting parts (53, 63), and the stator (2) and the power connector 6 include earth connecting parts (34, 64).

4 Claims, 4 Drawing Sheets

(56) References Cited

U.S. PATENT DOCUMENTS

| | | | |
|---|---|---|---|
| 2003/0156954 A1* | 8/2003 | Kimura | F04C 18/0215 417/410.5 |
| 2008/0138226 A1* | 6/2008 | Koitabashi | F04C 23/008 418/55.1 |
| 2014/0199870 A1 | 7/2014 | Tamaki et al. | |
| 2015/0145359 A1* | 5/2015 | Okada | H02K 5/225 310/71 |
| 2015/0222156 A1* | 8/2015 | Tomizawa | H02K 5/225 310/88 |

FOREIGN PATENT DOCUMENTS

| | | |
|---|---|---|
| CN | 104682613 A | 6/2015 |
| JP | 2009-043839 A | 2/2009 |
| JP | 2014-143897 A | 8/2014 |
| JP | 2015-104283 A | 6/2015 |

OTHER PUBLICATIONS

An Office Action mailed by the Chinese Patent Office dated Jan. 16, 2019, which corresponds to Chinese Patent Application No. 201710237563.6 and is related to U.S. Appl. No. 15/483,175 with English language concise explanation.

* cited by examiner

PRIOR ART FIG. 5
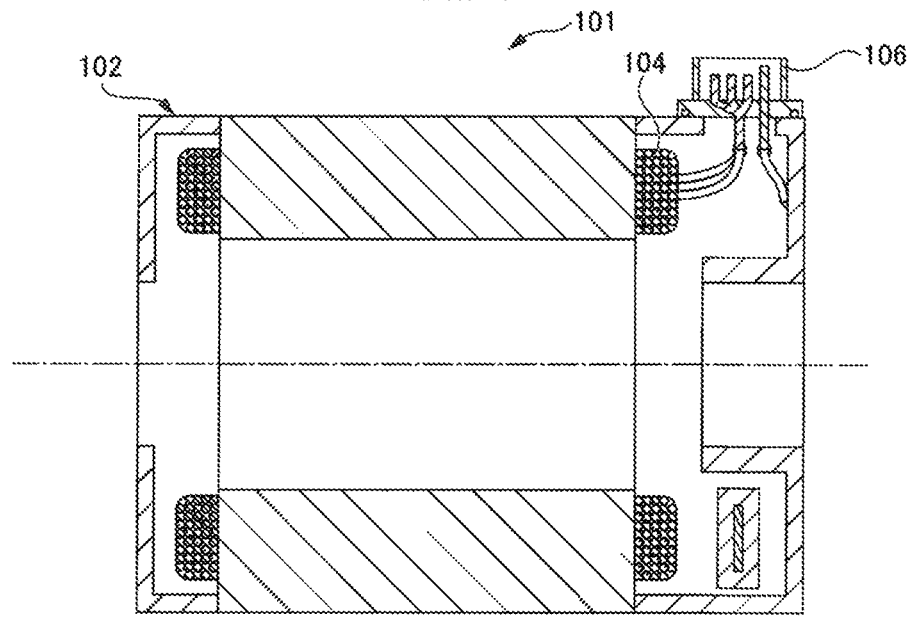
PRIOR ART FIG. 6
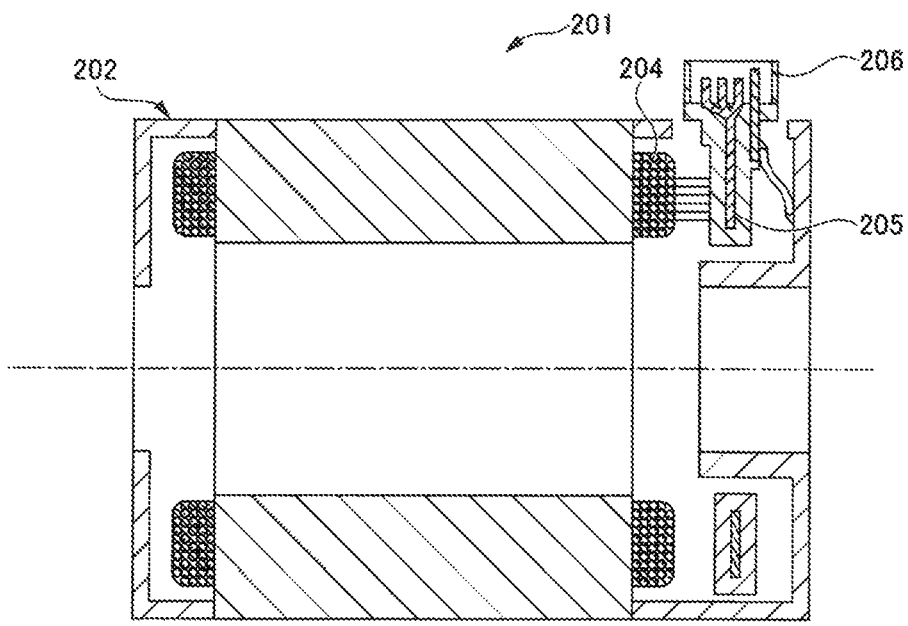

WATERPROOF STRUCTURE FOR ELECTRIC MOTOR

This application is based on and claims the benefit of priority from Japanese Patent Application No. 2016-080874, filed on 14 Apr. 2016, the content of which is incorporated herein by reference.

BACKGROUND OF THE INVENTION

Field of the Invention

The present invention relates to a waterproof structure for an electric motor in which the stator includes a power connector.

Related Art

Conventionally, connection between the winding of a stator and a power connector in this type of electric motor is performed by way of soldering as shown in FIG. 5. More specifically, a winding 104 of a stator 102 is directly soldered to the back side of a power connector 106. In addition, it is necessary to ground the power connector 106 to the stator 102. For this reason, such a means of connection is unfit for automation.

To address this, it has been proposed to make a structure that is easy to automate by performing wiring (wire connection) of a winding 204 of a stator 202 by way of a wiring substrate 205, and using the wiring substrate 205 in which a power connector 206 has been integrated with this wiring substrate 205. In addition, an easily replaceable connector has also been proposed (refer to Patent Document 1).

Patent Document 1: Japanese Unexamined Patent Application, Publication No. 2009-43839

SUMMARY OF THE INVENTION

However, in the case of the wiring substrate 205 in which the power connector 206 is integrated with the wiring substrate 205 of the form shown in FIG. 6, a gap forms at a boundary portion between the surface of the stator 202 and the power connector 206. For this reason, in the case of making an electric motor 201 as a waterproof structure, it is necessary to fill the gap between the resin of the surface of the stator 202 and the power connector 206 with a sealing agent or the like. In addition, it is necessary to ground the wiring substrate 205 to the stator 202.

The present invention has an object of providing a waterproof structure for an electric motor that, with a specification separating a power connector from a wiring substrate, can simultaneously achieve electrical connection between the power connector and the wiring substrate for performing wiring of a winding, earth connection between the power connector and a stator, and sealing between the power connector and the stator, in a state in which the power connector is installed.

According to a first aspect of the present invention, in a waterproof structure for an electric motor (for example, the electric motor 1 described later) including a stator (for example, the stator 2 described later) that includes a wiring substrate (for example, the wiring substrate 5 described later) for performing wiring of a winding (for example, the winding 4 described later), and a power connector (for example, the power connector 6 described later) that is separate from the wiring substrate, in which a sealing member (for example, the sealing member 7 described later) for sealing between the power connector and the stator, in a state of the power connector being installed to the stator, is provided to the power connector; the wiring substrate includes a connector connecting part (for example, the connector connecting part 53 described later) that is electrically connected with the power connector; the stator includes an earth connecting part (for example, the earth connecting part 34 described later); the power connector includes a substrate connecting part (for example, the substrate connecting part 63 described later) that is electrically connected with the connector connecting part of the wiring substrate, and an earth connecting part (for example, the earth connecting part 64 described later) that is electrically connected with the earth connecting part of the stator; and the substrate connecting part of the power connector and the connector connecting part of the wiring substrate are electrically connected, the earth connecting part of the power connector and the earth connecting part of the stator are electrically connected, and between the power connector and the stator are sealed by way of the sealing member, in a state of the power connector being installed to the stator.

According to a second aspect of the present invention, in the waterproof structure for an electric motor as described in the first aspect, the power connector may be selectable among a plurality of types of connectors.

According to a third aspect of the present invention, in the waterproof structure for an electric motor as described in the first or second aspect, the sealing member may be a sealing member consisting of an elastic body.

According to a fourth aspect of the present invention, in the waterproof structure for an electric motor as described in the first or second aspect, the sealing member may be a sealing member consisting of liquid.

According to the present invention, it is possible to simultaneously achieve electrical connection between a substrate connecting part of a power connector and a wiring substrate for performing wiring of a winding, earth connection between an earth connecting part of the power connector and an earth connecting part of a stator, and sealing between the power connector and the stator, in a state in which the power connector is installed to the stator.

BRIEF DESCRIPTION OF THE DRAWINGS

FIG. 5 is a longitudinal cross-sectional view showing an example of a stator of a conventional electric motor; and FIG. 6 is a longitudinal cross-sectional view showing another example of a stator of a conventional electric motor.

DETAILED DESCRIPTION OF THE INVENTION

Hereinafter, embodiments of the present invention will be explained while referencing the drawings.

Figure 1:
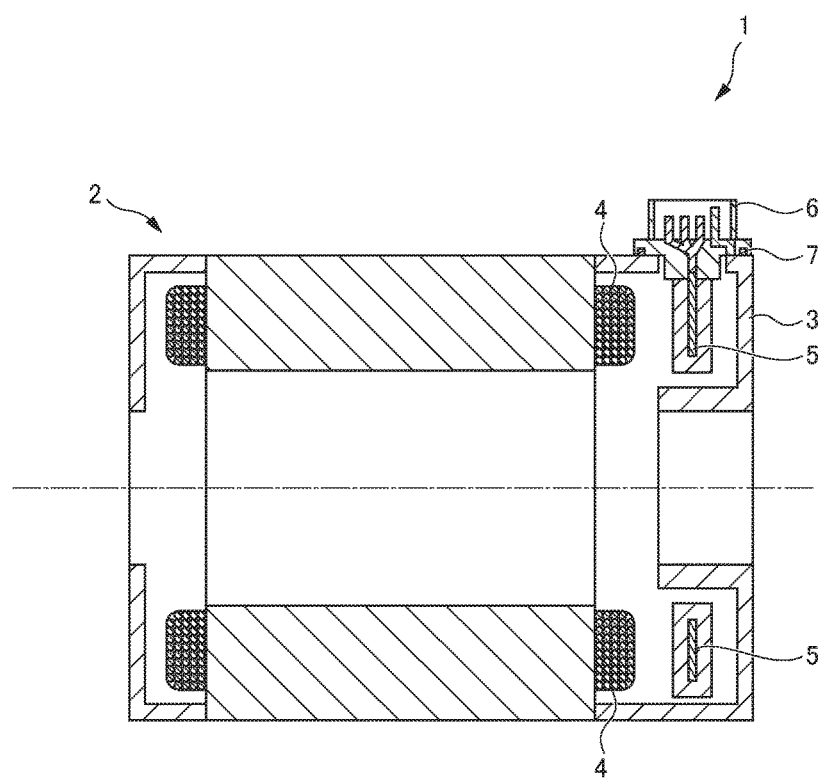
FIG. 1 is a longitudinal cross-sectional view showing a stator of an electric motor according to an embodiment.
Figure 2:
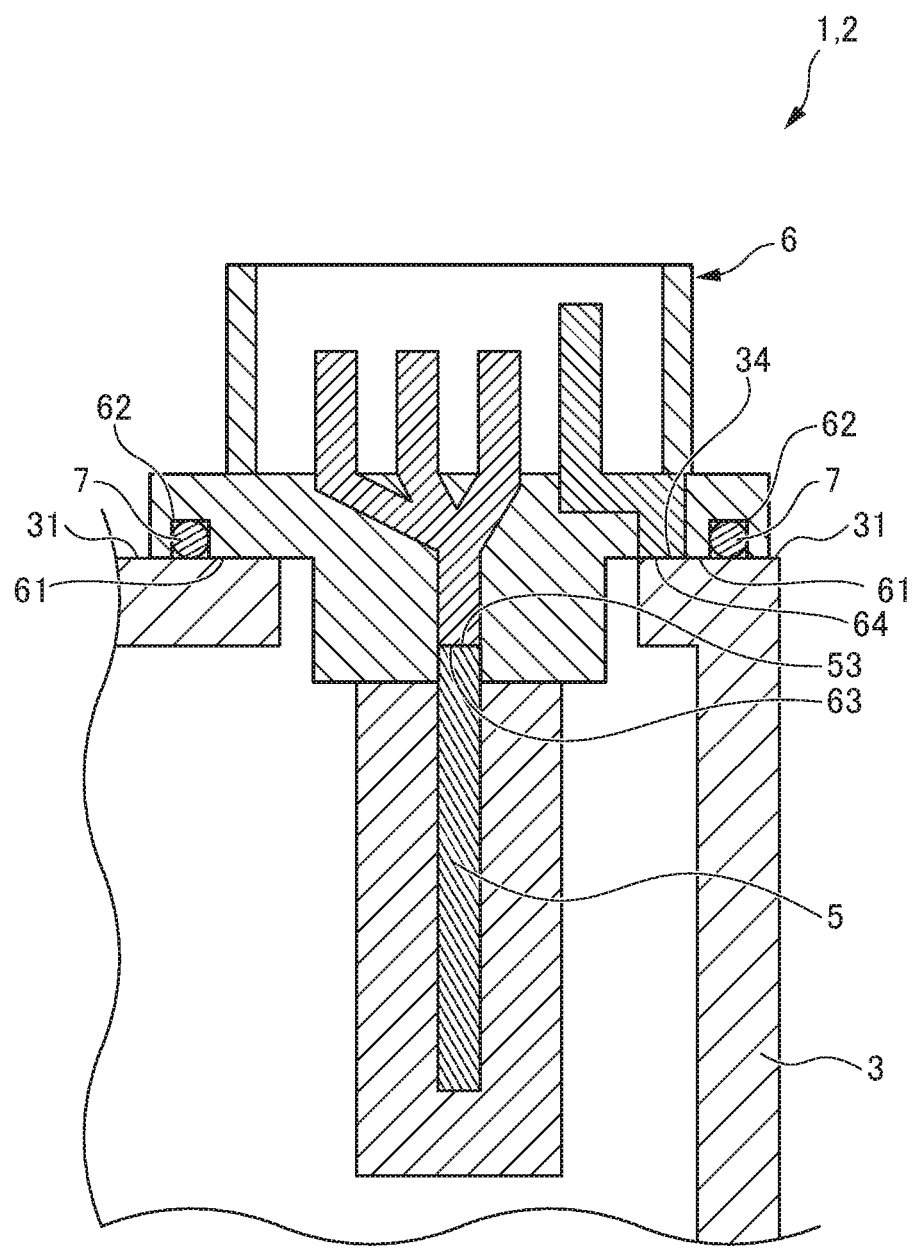
FIG. 2 is an enlarged view showing a principal part of the stator in FIG. 1.

FIG. 1 is a longitudinal cross-sectional view showing a stator of an electric motor according to the present embodiment, and FIG. 2 is an enlarged view showing a principal part of the stator in FIG. 1.

As shown in FIGS. 1 and 2, a stator 2 of an electric motor 1 includes a housing 3, a winding 4, a wiring substrate 5, a power connector 6, and a sealing member 7. The housing 3 forms an outer side of the stator 2. The winding 4 is wound around a predetermined position of the housing 3 and retained. The wiring substrate 5 is provided at a predetermined position of the housing 3, and performs wiring (wire connection) of the winding 4. The power connector 6 is configured separately from the wiring substrate 5, and is retrofitted to a predetermined position of the stator 2. The sealing member 7 is arranged at a predetermined position of the power connector 6. The sealing member 7 seals between the power connector 6 and the stator 2, when the power connector 6 is installed to the stator 2.

More specifically, the power connector 6 has an abutting face 61. The abutting face 61 abuts a supporting face 31 of the housing 3 of the stator 2 when the power connector 6 is retrofitted to the stator 2. A recess groove 62 is provided in this abutting face 61. The sealing member 7 is arranged within the recess groove 62, and seals between the abutting face 61 of the power connector 6 and the supporting face 31 of the housing 3 of the stator 2.

The power connector 6 has a substrate connecting part 63. The wiring substrate 5 has a connector connecting part 53. The substrate connecting part 63 of the power connector 6 and the connector connecting part 53 of the wiring substrate 5 are provided at mutually corresponding positions when the power connector 6 is retrofitted to a predetermined position of the stator 2. Then, when the power connector 6 is retrofitted to the stator 2, the substrate connecting part 63 of the power connector 6 and the connector connecting part 53 of the wiring substrate 5 are electrically connected to each other. For this reason, the winding 4 of the stator 2 and the power connector 6 are electrically connected via the wiring substrate 5.

The power connector 6 has an earth connecting part 64. The housing 3 of the stator 2 has an earth connecting part 34. The earth connecting part 64 of the power connector 6 and the earth connecting part 34 of the housing 3 of the stator 2 are provided at mutually corresponding positions when the power connector 6 is retrofitted to a predetermined position of the stator 2. Then, when the power connector 6 is retrofitted to the stator 2, the earth connecting part 64 of the power connector 6 and the earth connecting part 34 of the housing 3 of the stator 2 are electrically connected to each other.

For this reason, when the power connector 6 is retrofitted to the stator 2, the following three items are achieved simultaneously. First, the substrate connecting part 63 of the power connector 6 and the connector connecting part 53 of the wiring substrate 5 are electrically connected. Second, the earth connecting part 64 of the power connector 6 and the earth connecting part 34 of the housing 3 of the stator 2 are electrically connected. Third, between the abutting face 61 of the power connector 6 and the supporting face 31 of the housing 3 of the stator 2 are sealed by way of the sealing member 7.

According to the present embodiment, since the wiring (wire connection) of the winding 4 is performed by way of the wiring substrate 5 in the above way, it is a wiring (wire connection) method that is easy to automate. In addition, it is possible to seal between the abutting face 61 of the power connector 6 and the supporting face 31 of the housing 3 of the stator 2 by way of the sealing member 7, due to separating the wiring substrate 5 and power connector 6, and then retrofitting the power connector 6 to the stator 2.

FIG. 2 illustrates so that the substrate connecting part 63 of the power connector 6 and the connector connecting part 53 of the wiring substrate 5 connect with each other in a butting system. However, the electrical connection system between the substrate connecting part 63 of the power connector 6 and the connector connecting part 53 of the wiring substrate 5 is not limited thereto. For example, using a connection system engaging with each other, a connection system that pushes together, or another arbitrary electrical connection system, it is possible to electrically connect the substrate connecting part 63 of the power connector 6 and the connector connecting part 53 of the wiring substrate 5. This similarly applies also for the earth connection between the earth connecting part 64 of the power connector 6 and the earth connecting part 34 of the housing 3 of the stator 2.

Figure 3:
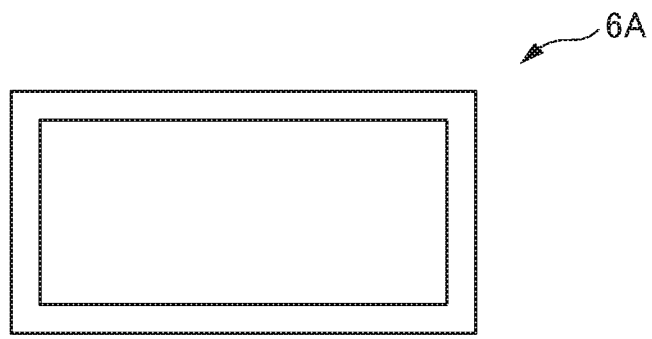
FIG. 3 is a plan view showing an example of a connector.
Figure 4:
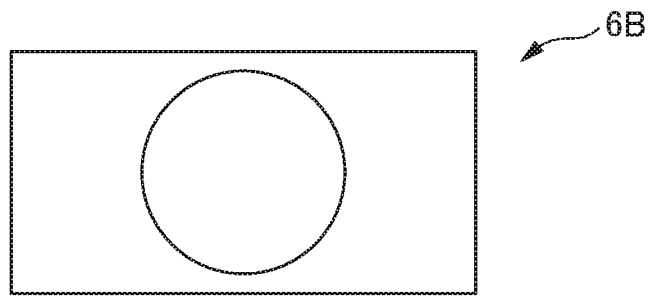
FIG. 4 is a plan view showing another example of a connector.

FIG. 3 is a plan view showing a rectangular connector 6A. FIG. 4 is a plan view showing a round connector 6B. The power connector 6 can adopt the rectangular connector 6A shown in FIG. 3, or can adopt the round connector 6B shown in FIG. 4 depending on the application, and it is further possible to adopt a connector of another arbitrary shape.

The sealing member 7 is a sealing member consisting of a rubber-like elastic body. However, the sealing member 7 may be a sealing member consisting of liquid.

Although an embodiment of the present invention has been explained above, the present invention is not to be limited to the aforementioned embodiment, and modifications and improvements within a scope that can achieve the objects of the present invention are also included in the present invention. In addition, the effects described in the present embodiment are merely listing the most preferred effects produced from the present invention, and the effects according to the present invention are not to be limited to those described in the present embodiments.

EXPLANATION OF REFERENCE NUMERALS 1 electric motor
2 stator
34 earth connecting part
4 winding
5 wiring substrate
53 connector connecting part
6 power connector
63 substrate connecting part
64 earth connecting part
7 sealing member

What is claimed is:

1. A waterproof structure for an electric motor comprising:
    a stator that includes a wiring substrate for performing wiring of a winding; and
    a power connector that is separate from the wiring substrate, wherein:
    a sealing member for sealing between the power connector and the stator, in a state of the power connector being installed to the stator, is provided to the power connector,
    the wiring substrate includes a connector connecting part that is electrically connected with the power connector,
    the stator includes a first earth connecting part,
    the power connector includes a substrate connecting part that is electrically connected with the connector connecting part of the wiring substrate, and a second earth connecting part that is electrically connected with the first earth connecting part of the stator,
    the substrate connecting part of the power connector and the connector connecting part of the wiring substrate are electrically connected, the second earth connecting part of the power connector and the first earth connecting part of the stator are electrically connected, and between the power connector and the stator are sealed by way of the sealing member, in a state of the power connector being installed to the stator, the second earth connecting part of the power connector directly contacts the first earth connecting part of the stator on a supporting face of the stator where the power connector abuts the stator, and the second earth connecting part of the power connector is disposed at a part which is sealed by an abutting face of the power connector, the supporting face of the stator and the sealing member.

2. The waterproof structure for an electric motor according to claim 1, wherein the power connector is selectable among a plurality of types of connectors.

3. The waterproof structure for an electric motor according to claim 1, wherein the sealing member is a sealing member consisting of an elastic body.

4. The waterproof structure for an electric motor according to claim 1, wherein the sealing member is a sealing member consisting of liquid.

* * * * *